US011227254B2

(12) United States Patent
DeBates et al.

(10) Patent No.: US 11,227,254 B2
(45) Date of Patent: Jan. 18, 2022

(54) IDENTIFICATION TAG ON SEALING SURFACES TO INDICATE SEAL INTEGRITY

(71) Applicant: Motorola Mobility LLC, Chicago, IL (US)

(72) Inventors: Scott Patrick DeBates, Crystal Lake, IL (US); Douglas Alfred Lautner, Round Lake, IL (US); Jagatkumar V. Shah, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 969 days.

(21) Appl. No.: 15/659,831

(22) Filed: Jul. 26, 2017

(65) Prior Publication Data

US 2019/0034867 A1    Jan. 31, 2019

(51) Int. Cl.
*G06Q 10/08*    (2012.01)
*G08B 13/24*    (2006.01)
*G06K 19/07*    (2006.01)
*G06K 19/077*    (2006.01)

(52) U.S. Cl.
CPC ..... *G06Q 10/0832* (2013.01); *G06Q 10/0833* (2013.01); *G08B 13/2448* (2013.01); *G08B 13/2462* (2013.01); *G06K 19/0723* (2013.01); *G06K 19/07775* (2013.01)

(58) Field of Classification Search
CPC .......... G06Q 10/0832; G06Q 10/0833; G08B 13/2448; G08B 13/2462; G06K 19/0723; G06K 19/07775
See application file for complete search history.

(56) References Cited

U.S. PATENT DOCUMENTS

| 9,471,817 | B1 * | 10/2016 | Alhazme ......... G06K 19/07345 |
| 9,922,306 | B1   | 3/2018  | Russell et al. |
| 2004/0069850 | A1 | 4/2004 | De Wilde |
| 2007/0069895 | A1 * | 3/2007 | Koh ..................... G06K 19/02 |
| | | | 340/572.1 |
| 2007/0296581 | A1 | 12/2007 | Schnee et al. |
| 2011/0167180 | A1 | 7/2011 | Towell et al. |
| 2014/0075572 | A1 | 3/2014 | Mehring et al. |
| 2014/0172739 | A1 | 6/2014 | Anderson et al. |
| 2014/0280510 | A1 | 9/2014 | Putnam et al. |
| 2015/0090625 | A1 * | 4/2015 | Bauss .................... B65D 23/08 |
| | | | 206/459.5 |

(Continued)

OTHER PUBLICATIONS

Non-Final Office Action from related U.S. Appl. No. 15/659,965 dated May 3, 2019.

(Continued)

*Primary Examiner* — Matthew Mikels
(74) *Attorney, Agent, or Firm* — Philip H. Burrus, IV

(57) ABSTRACT

An apparatus includes a first surface having an identification tag attached thereto and a second surface having an antenna attached thereto. The first surface engages the second surface to provide a seal for an article and to connect the antenna to the identification tag. A method for sealing an article includes providing a first surface having an identification tag attached thereto. A second surface having an antenna attached thereto is provided. The first surface is attached to the second surface to provide a seal for the article and to connect the antenna to the identification tag.

20 Claims, 8 Drawing Sheets

(56) References Cited

U.S. PATENT DOCUMENTS

2015/0129666 A1* 5/2015 Butler .................. H04L 67/04
                                                               235/492
2016/0137396 A1* 5/2016 Brownfield .......... B65D 17/404
                                                               53/434
2018/0341911 A1    11/2018 Daoura et al.

OTHER PUBLICATIONS

Non-Final Office Action from related U.S. Appl. No. 15/659,860 dated Mar. 6, 2019.
Non-Final Office Action from related U.S. Appl. No. 15/660,002 dated Jun. 27, 2019.

* cited by examiner

IDENTIFICATION TAG ON SEALING SURFACES TO INDICATE SEAL INTEGRITY

BACKGROUND

Field of the Disclosure

The disclosed subject matter relates generally to mobile computing systems and, more particularly, to using identification tags in a mobile device for dynamic delivery tracking.

Description of the Related Art

Traditional delivery services employ identification codes or bar codes on articles for delivery tracking. The bar codes are scanned or identification numbers are entered by operators into a tracking system. Such approaches are prone to human error in that articles may not be properly scanned or logged into or out of a facility, vehicle, etc. Such approaches also are limited in the data that can be collected about the conditions of the article during the delivery process. Bar/identification code tracking allows only location information to be tracked.

Delivery systems are moving to more decentralized models, where independent drivers may be contracted to make deliveries as opposed to a single organization maintaining a fleet of delivery vehicles and fixed delivery routes for article transport and delivery. For example, similar to how independent drivers are contracted to provide taxi services (e.g., companies such as UBER®), independent drivers may also be used for decentralized delivery services, or even a combination of delivery and taxi services. Each driver may have a relatively small number of packages, thereby requiring dynamic routes as opposed to the fixed routes employed in traditional delivery. The efficient implementation of decentralized delivery services may require the collection of additional data regarding the conditions of the articles during delivery other than just location tracking.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical articles.

DETAILED DESCRIPTION OF EMBODIMENT(S)

FIGS. 1-12 illustrate example techniques for employing identification tags to collect data during delivery to provide for increased article control, condition monitoring and dynamic delivery routing. Identification tags on articles may be employed by readers in a delivery vehicle to dynamically track inventory, plan routes, store article condition data, etc.

Figure 1:
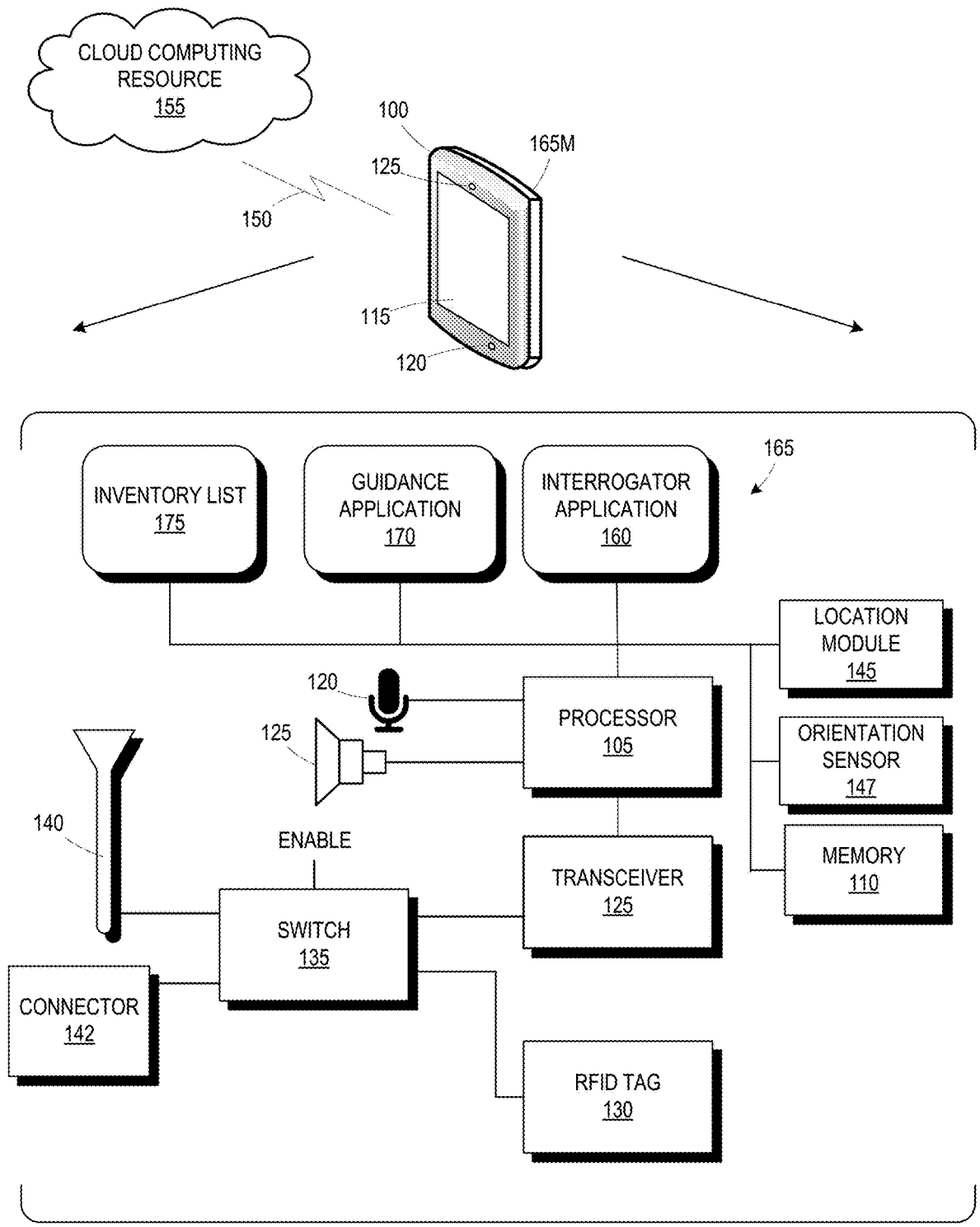
FIG. 1 is a simplified block diagram of a device operable to employ identification tags to track delivery of articles, in accordance with some embodiments.

FIG. 1 is a simplistic block diagram of one illustrative example of a device 100 disclosed herein that includes, among other things, a processor 105, a memory 110, a display 115, a speaker 120, a transceiver 125, an identification tag 130 (e.g., a radio frequency identification (RFID) tag), a switch 135, an antenna 140, a location module 145 (e.g., global positioning system (GPS) module), and an orientation sensor 147 (e.g., an accelerometer, magnetometer, mercury switch, gyroscope, compass or some combination thereof). The orientation sensor 147 is provided to measure the position of the device 100 relative to a physical reference point or surface. The orientation sensor 147 may be a physical sensor or a virtual sensor that receives data from a physical sensor and processes that data to determine the position of the device 100. The memory 110 may be a volatile memory (e.g., DRAM, SRAM) or a non-volatile memory (e.g., ROM, flash memory, hard disk, etc.). The transceiver 125 transmits and receives signals via the antenna 140 to implement identification tag reading functionality and to communicate with remote devices. The transceiver 125 may include one or more radios for communicating according to different radio access technologies and over multiple frequency bands (e.g., cellular, Wi-Fi, Bluetooth®, ZigBee, etc.) over a communication line 150. The communication link 150 may have a variety of forms. In some embodiments, the communication link 150 may be a wireless radio or cellular radio link. The communication link 150 may also communicate over a packet-based communication network, such as the Internet. In one embodiment, a cloud computing resource 155 may interface with the device 100 to implement one or more of the functions described herein. In various embodiments, the device 100 may be embodied in a handheld or wearable device, such as a laptop computer, a handheld computer, a tablet computer, a mobile device, a telephone, a personal data assistant, a music player, a game device, a wearable computing device and the like.

To the extent certain example aspects of the device 100 are not described herein, such example aspects may or may not be included in various embodiments without limiting the spirit and scope of the embodiments of the present application as would be understood by one of skill in the art.

In the device 100, the processor 105 may execute instructions stored in the memory 110 and store information in the memory 110, such as the results of the executed instructions. Some embodiments of the processor 105 and the memory 110 may be configured to implement an interrogator application 160. For example, the processor 105 may execute the interrogator application 160 to query a nearby identification tag associated with an article being delivered to extract information, such as identification data, condition data, delivery data, etc., to facilitate delivery planning and tracking. The processor 105, memory 110, transceiver 125 and interrogator application 160 collectively define an interrogator 165. The particular software and signaling techniques for implementing the interrogator 165 are known to those of ordinary skill in the art, so they are not described in detail herein.

In some embodiments, one or more portions of the system illustrated in FIG. 1 may be housed in an interrogator module 165M that may be attached to the mobile device 100 as being opposed to being mounted within the mobile device 100. For example, a separate transceiver, antenna, identification tag, etc., for implementing the interrogator 165 may be housed in the interrogator module 165M and physically and electrically attached to the mobile device 100.

In general, an identification tag is a passive device that does not require a power source to function. An identification tag includes non-volatile memory or logic that stores data, such as identification data, security data or instruction data, and transmits the stored data using a backscattering modulation technique responsive to a query from an interrogator, such as the interrogator 165, in reading the identification tag. The particular circuit elements for constructing identification tags are known to those of ordinary skill in the art, so they are not described in detail herein. The switch 135 allows the identification tag 130 and the interrogator 165 to share the antenna 140 responsive to an enable signal. In some embodiments, separate antennas (not shown) may be provided. The switch 135 may also selectively couple the transceiver 125 to an external connector 142 to allow the connection of an external antenna to increase the range of the interrogator. The connector 142 may be part of the conventional charging/data connector of the device 100, or it may be a separate connector on the device 100 or the attached interrogator module 165M. The processor 105 and the memory 110 may also be configured to implement a guidance application 170 for displaying dynamic route information to a user of the mobile device 100 for delivering articles.

Figure 2:
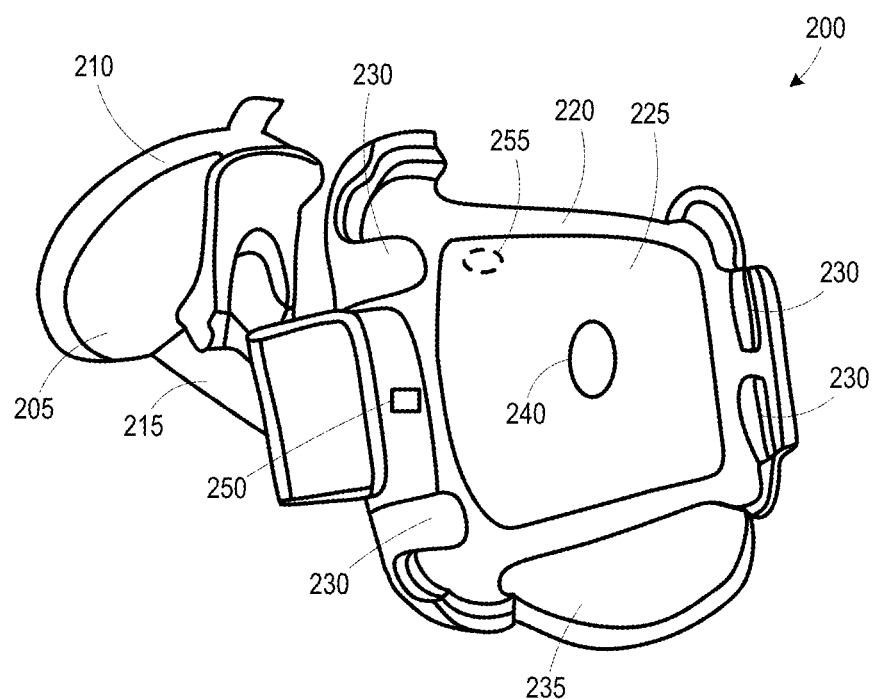
FIG. 2 is a diagram of a docking station having an external antenna and configured to receive the mobile device of FIG. 1, in accordance with some embodiments.

FIG. 2 is a diagram of a docking station 200 for receiving the mobile device 100, in accordance with some embodiments. The docking station 200 includes a base 205 with an attached suction cup 210 for attaching the docking station 200 to a surface, such as a windshield of a vehicle. In some embodiments, the base 205 may include a fixed mounting surface, allowing it to be secured by fasteners (e.g., bolts) to the vehicle. A neck 215 extends from the base 205 to a body 220 of the docking station 200. The body 220 has a face surface 225 and a plurality of tabs 230 for receiving the mobile device 100. The docking station 200 includes an antenna 235 and an identification tag 240.

When a mobile device 100 is placed in the docking station 200, the interrogator 165 (see FIG. 1) of the mobile device 100 may query the identification tag 240 to determine the capabilities of the docking station 200 (e.g., the presence of a power source, antenna 235, etc.). A connector 250 on the docking station may interface with the corresponding connector 142 on the mobile device 100 (i.e., or the interrogator module 165M attached to the mobile device 100) to provide a power source and/to provide a connection point for the antenna 235. In general, the antenna 235 has an increased range as compared to the internal antenna 140 of the device 100, thereby allowing the interrogator 165 to cover a larger scan volume. The size and configuration of the antenna 235 may vary depending on the particular application and the intended range. As an alternative to the identification tag 240 indicating the presence of the antenna 235, an optional triggering device 255, such as a magnet, may be provided on the body 220 that can be sensed by the mobile device 100 (e.g., using a hall effect sensor) to indicate the presence of the antenna 235.

Figure 3:
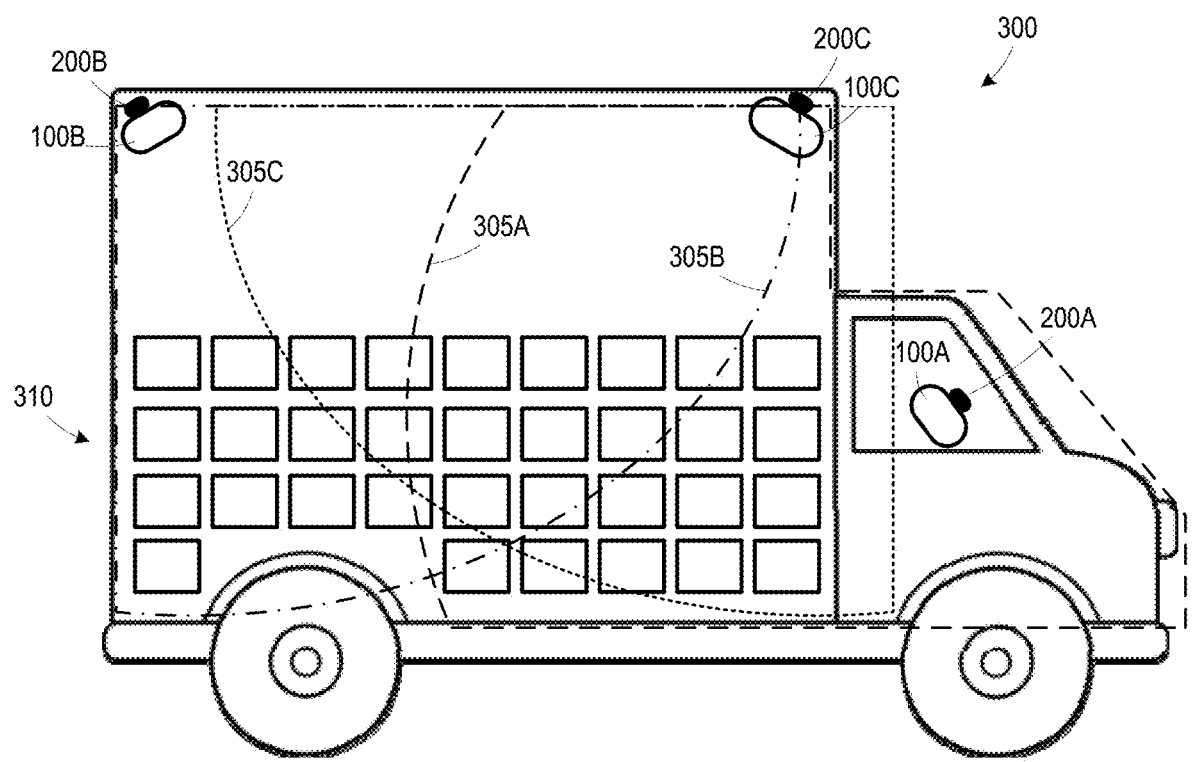
FIG. 3 is a diagram of a vehicle including the device of FIG. 1 and the docking station of FIG. 2, in accordance with some embodiments.
Figure 4:
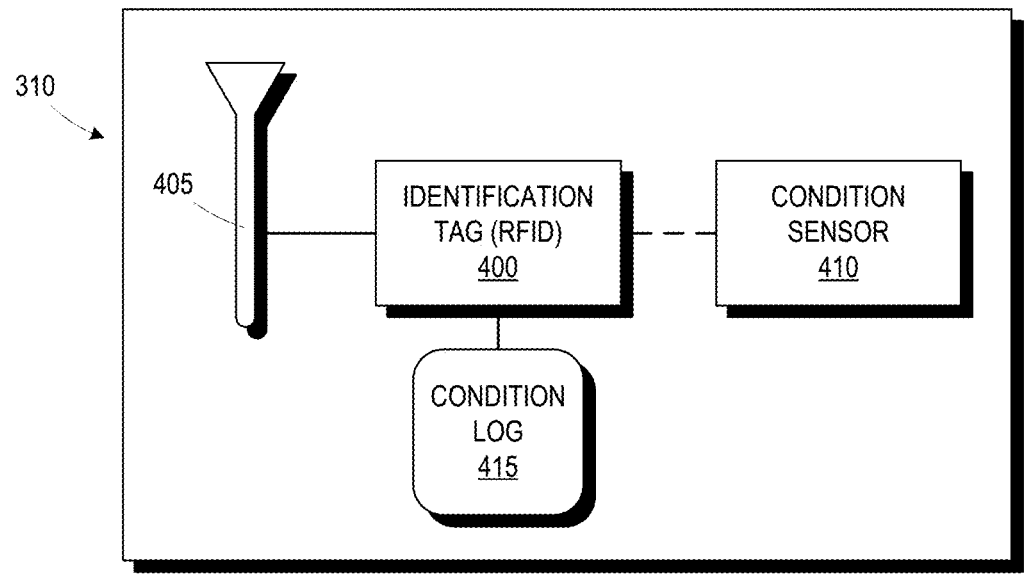
FIG. 4 is a diagram of an identification tag, antenna and condition sensor for storing data regarding articles, in accordance with some embodiments.

FIG. 3 is a diagram of a vehicle 300 including one or more docking stations 200A, 200B, 200C with mounted mobile devices 100A, 100B, 100C, in accordance with some embodiments. Each mobile device 100 has a scan volume 305A, 305B, 305C. The scan volumes 305A, 305B, 305C may or may not overlap. A plurality of articles 310 may be present in the vehicle 300. As illustrated in FIG. 4, each article 310 includes an associated identification tag (e.g., RFID tag) 400 and an antenna 405. Data on the identification tags 400 may include article ID number, sealed date, delivery location, Food and Drug Administration (FDA) approval data, condition data, guaranteed delivery time data, etc. Some of the articles 310 may also include a condition sensor 410 that detects a condition of the article 310 and stores data regarding the condition on the identification tag (i.e., as described in greater detail below). Not all of the docking stations 200 may have external antennas 235, so the associated device 100 may use its internal antenna 140. The number of docking stations 200 and mobile devices 100 may vary depending on the size of the vehicle 300 to provide that the scan volumes cover the entire vehicle 300. The mobile devices 100A, 100B, 100C may communicate with one another directly, or via exchanges with the cloud computing resource 155. The mobile devices 100A, 100B, 100C may coordinate with one another to track articles 310 in the vehicle 300.

Figure 5:
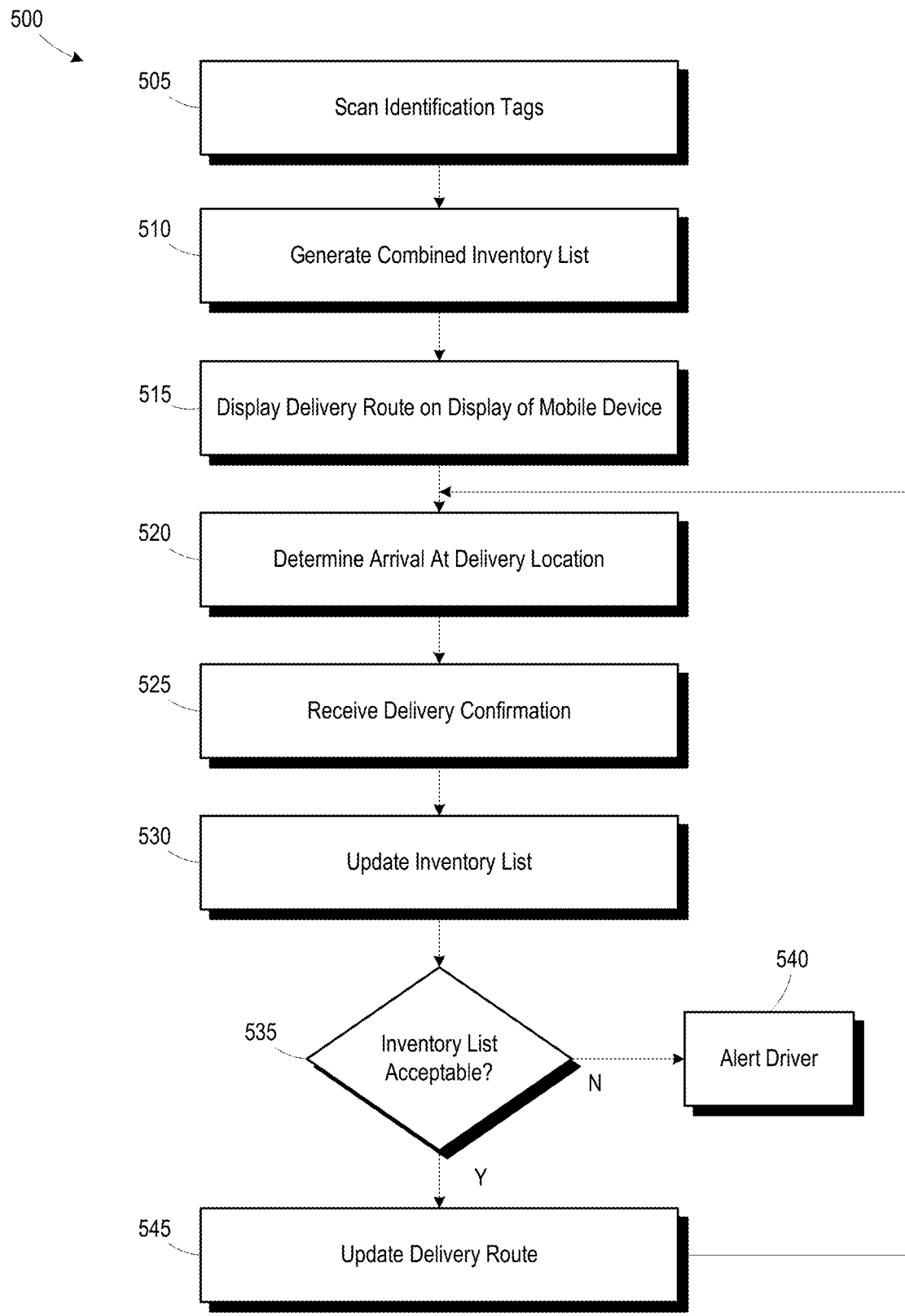
FIG. 5 is a flow diagram of a method for tracking article inventory in a vehicle, in accordance with some embodiments.

FIG. 5 is a flow diagram of a method 500 for tracking article inventory in a vehicle 300, in accordance with some embodiments. In method block 505, each of the mobile devices 100A, 100B, 100C reads the identification tags 400 in its respective scan volume 305A, 305B, 305C.

In method block 510, a combined inventory list 175 (see FIG. 1) is generated. Each of the mobile devices may share their respective local inventory lists. In some embodiments, one of the mobile devices 100A may be designated as a master device. The other devices 100B, 100C may send their local inventory lists to the mobile device 100A. The mobile device 100A may generate a combined inventory list 175 by combining the local lists and removing duplicates (i.e., due to overlapping scan volumes 305A, 305B, 305C). In some embodiments, each of the mobile devices 100A, 100B, 100C may send its local inventory list to the cloud computing resource 155, which may generate the combined inventory list 175 and send it to the designated master device 100A. The delivery locations for the articles 310 may be stored on the associated identification tags 400 or it may be received from the cloud computing resource 155 based on an identification code associated with the article 310.

Data from the orientation sensors 147 of the devices 100A, 100B, 100C may be used to determine the placement angle of the devices, from which the scan volumes 305A, 305B, 305C may be estimated. Based on knowledge of the scan volumes 305A, 305B, 305C from the placement angle and knowledge of articles 310 that are located in overlap region, the approximate location of a particular article 310 (e.g., front, middle, rear) may be estimated by the master device 100A.

Figure 6:
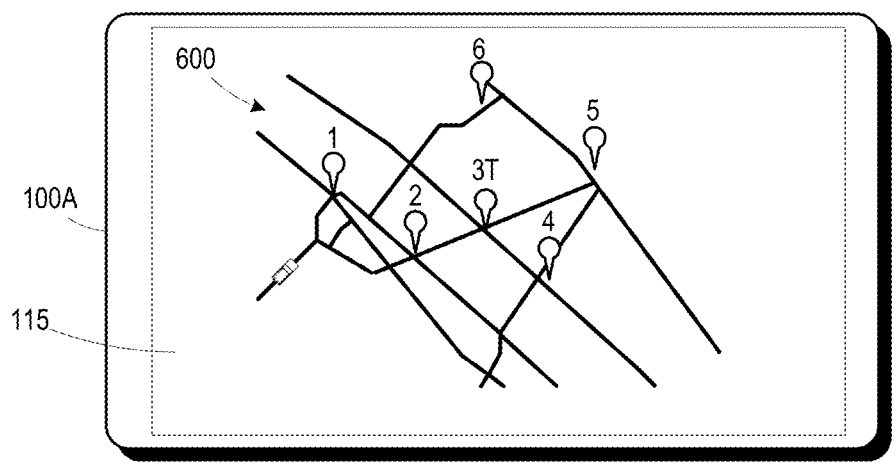
FIG. 6 is a simplified diagram of a mobile device illustrating an example delivery route provided on the display, in accordance with some embodiments.

In method block 515, a delivery route for the plurality of articles in the combined inventory list 175 is displayed on the display 115 of the mobile device 100A. FIG. 6 is a simplified diagram of the mobile device 100A illustrating an example delivery route 600 provided on the display 115, in accordance with some embodiments. In some embodiments, the mobile device 100A may generate the delivery route 600 itself, while, in other embodiments, the cloud computing resource 155 may generate the route 600 and send it to the mobile device 100A. The mobile device 100A may use its location module 145 to determine the location of the vehicle 300 relative to the route 600.

In method block 520, the mobile device 100A determines the arrival at a delivery location. The delivery location may be for the article 310 designated for the next stop on the delivery route 600, or, if the driver detoured to a different delivery location for some reason, it may be a location for a different one of the articles 310.

In method block 525, the mobile device 100A receives a delivery confirmation from the driver (e.g., user input), and the mobile device 100A updates the inventory list 175 in method block 530. Updating the inventory list 175 may include scanning all of the articles 310 on the vehicle 300, as described in reference to method blocks 505 and 510.

In method block 535, the mobile device 100A analyzes the updated inventory list 175 to identify any discrepancies. For example, the article 310 that was just confirmed being delivered may still be present in the vehicle 300, indicating that the wrong article 310 may have been delivered. A mis-delivery may also be indicated by an unexpected absence of a different article 310 on the inventory list 175. The unexpected absence of an article 310 may also indicate that an article 310 was surreptitiously removed from the vehicle 300 by another individual while the driver was away from the vehicle 300. If the inventory list 175 is not acceptable in method block 535, an alert is provided to the driver by the mobile device 100A in method block 540, such as a pop up message, an audible tone, etc.

In some embodiments, the mobile devices 100B, 100C not physically carried by the driver when away from the vehicle 300 may continuously scan and update their inventory lists 175 in method block 530 to determine if an unexpected article 310 is removed from the vehicle while the driver is away from the vehicle 300. An alert may be sent to the driver immediately if a removal is detected. The mobile devices 100B, 100C may be informed directly by the driver when a delivery is in progress, they may detect the lack of proximity of the mobile device 100A, or they may start the continuous inventory scanning whenever the vehicle 300 is stationary or at a delivery location.

Figure 7:
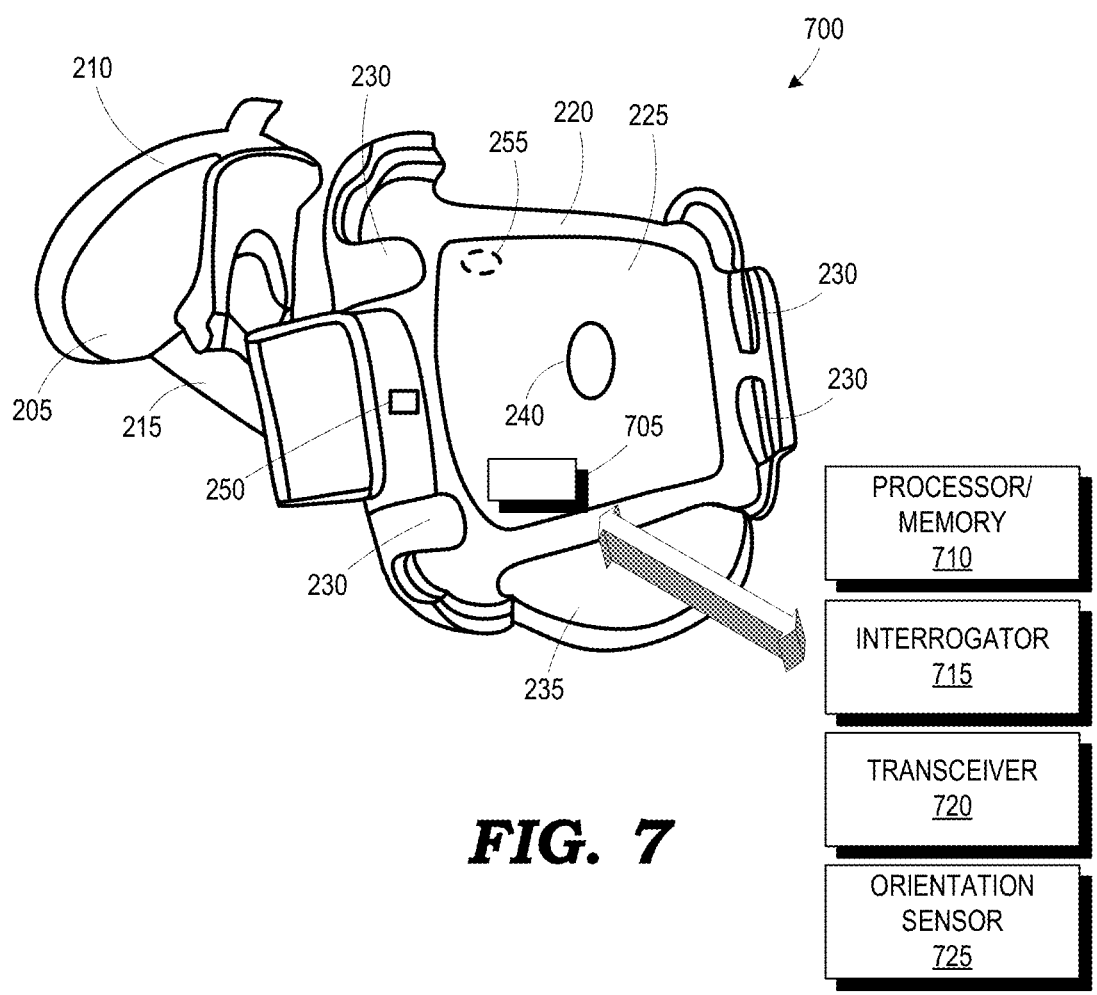
FIG. 7 is a diagram of an alternative docking station having an external antenna and a computing device and configured to receive the mobile device of FIG. 1, in accordance with some embodiments.

FIG. 7 is a diagram of an alternative docking station 700 for receiving the mobile device 100, in accordance with some embodiments. The docking station 700 includes a computing device 705 including elements similar to the mobile device 100 of FIG. 1, such as a processor with memory 710, an interrogator 715, a transceiver 720 and orientation sensor 725, etc. The computing device 705 may perform the inventory scanning and warning functions described above when the driver is away from the vehicle 300 to determine the surreptitious removal of an article 310 when the driver is away. This arrangement may be provided when only one mobile device 100 is provided to monitor the contents of the vehicle 300. The orientation sensor 725 may be used to determine the placement angle of the docking station 700 to estimate the scan volume and to assist in locating a particular article 310 in the vehicle 300, as described above.

If the inventory list 530 is acceptable in method block 535, the delivery route is updated in method block 545, and the method 500 returns to method block 520 at the next delivery location.

In some embodiments, one of the delivery locations may actually be a transfer location, where the driver is to transfer an article 310 to another driver. For example, the location 3T in FIG. 6 indicates a transfer location. The cloud computing resource 155 may manage the routes 600 of multiple drivers. If it is determined that it would be more efficient for a different driver to deliver an article 310, transfer locations may be added to the routes 600 of both drivers. The cloud computing resource 155 may estimate the time that both drivers may be in the location for the transfer. Depending on the particular situation, the transfer may be an outgoing transfer to the other driver (i.e., remove article in inventory), an incoming transfer (i.e., receive article in inventory), where an additional article is received, or an exchange (i.e., remove an article and receive a different article). In the context of the method 500 of FIG. 5, the mobile device 100A identifies the delivery location as a transfer location in method block 520. The delivery confirmation in method block 525 is an outgoing transfer confirmation, an incoming transfer confirmation, or an exchange confirmation. The inventory list 175 is updated in method block 530 to remove the transferred article 310 and/or to add the incoming article 310.

Returning to FIG. 4, some articles 310 may have associated condition sensors 410. The condition sensors 410 may be employed to monitor the conditions of the articles 310 during the delivery process. For example, some articles 310 may be temperature or moisture sensitive (e.g., perishable articles), shock sensitive (e.g., fragile articles), etc. The condition sensors 410 on the different articles 310 may vary depending on the associated sensitivity. Example condition sensors 410 include temperature sensors, humidity sensors, moisture sensors, shock sensors, vibration sensors, etc. The condition sensors 410 may be directly affixed to the article 310 or packaging associated with the article 310. One or more condition sensors 410 may also be associated with a container holding multiple articles (e.g., refrigeration unit) or the entire cargo area of the vehicle 300.

Data from the condition sensors 410 is periodically stored in the associated identification tag 400. In some embodiments, the condition sensors 410 may store the data directly in the tag 400. In some embodiments, the condition sensors 410 may communicate with the mobile devices 100A, 100B, 100C, which may, in turn, store the data in the tag 400. Although a single sensor 410 is shown servicing a single identification tag 400 in FIG. 4, in some embodiments, a particular sensor 410 may be associated with multiple articles 310.

Figure 8:
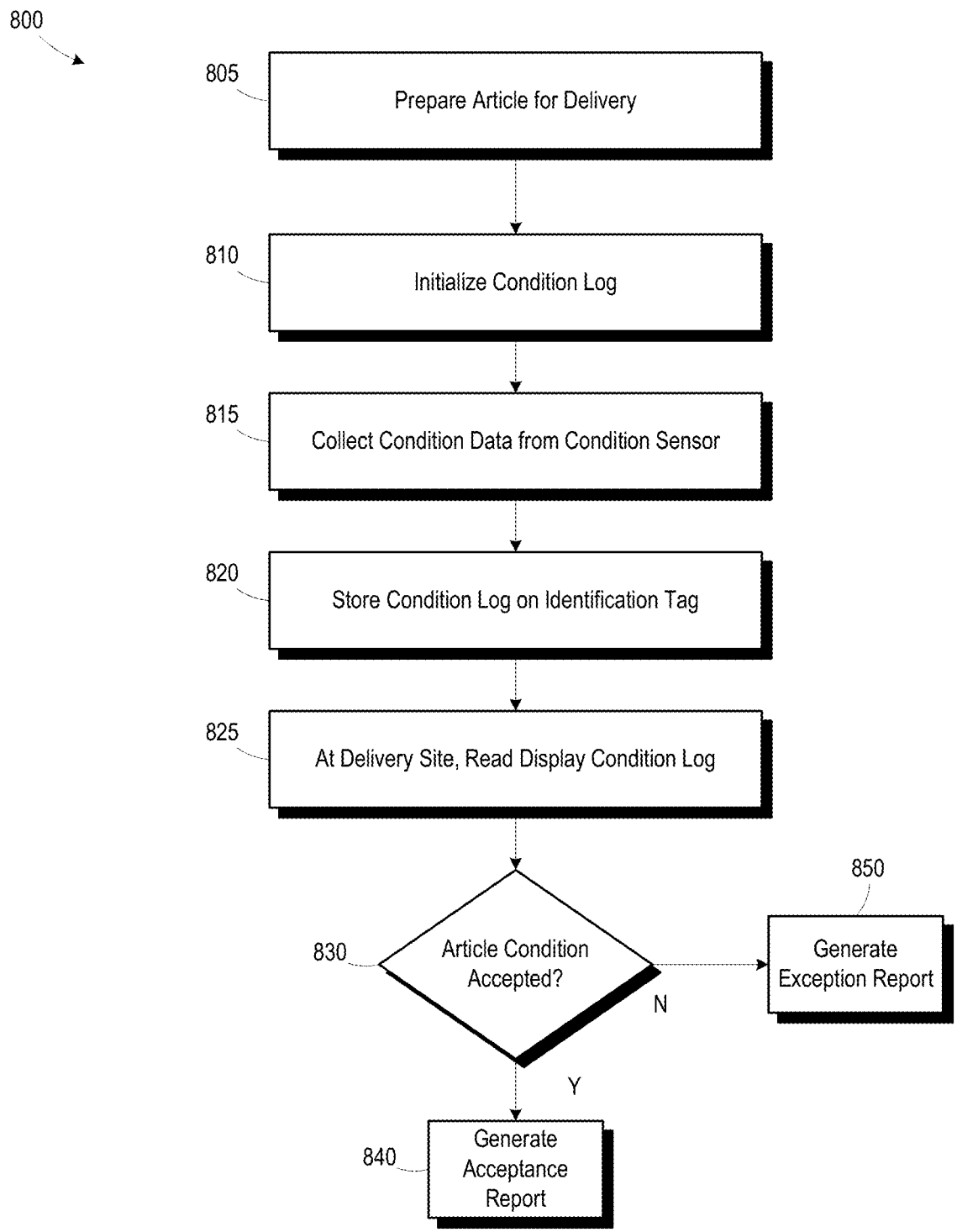
FIG. 8 is a flow diagram of a method for tracking article conditions using condition sensors during the delivery process, in accordance with some embodiments.

FIG. 8 is a flow diagram of a method 800 for tracking article conditions using the condition sensors 410 during the delivery process, in accordance with some embodiments. In method block 805, articles 310 with monitored conditions are prepared for delivery. This preparation may include packaging the articles 310 in a temperature-controlled container (e.g., cooler or refrigeration unit), a sealed package to prevent moisture intrusion, a shock resistant package, etc.

In method block 810, a condition log 415 (see FIG. 4) for the article 310 is initialized. In method block 815, condition data for a particular article 310 is collected using the condition sensor 410. In method block 820, the condition log 415 is stored in the identification tag 400 of the article 310. As described above, the sensors 410 may directly store the condition data, or the mobile devices 100A, 100B, 100C may store the condition data.

In method block 825, the condition log 420 is read at the delivery location. In some embodiments, the condition log 420 may be presented by the driver to the party accepting delivery so that the receiving party may indicate acceptance of the article condition at the time of delivery. The condition log 420 may demonstrate to the receiving party that temperature, moisture, shock, vibration, etc., conditions were within acceptable limits during the delivery process. A delivery request screen on the device 100A may show the condition log 420 and accept an input indicating that the article condition is acceptable.

If the article condition is accepted in method block 830, an acceptance report is generated in method block 840. If the article condition is not accepted in method block 830, an exception report is generated in method block 850. The acceptance or exception reports may be stored on the identification tag 400 for later retrieval.

Figure 9:
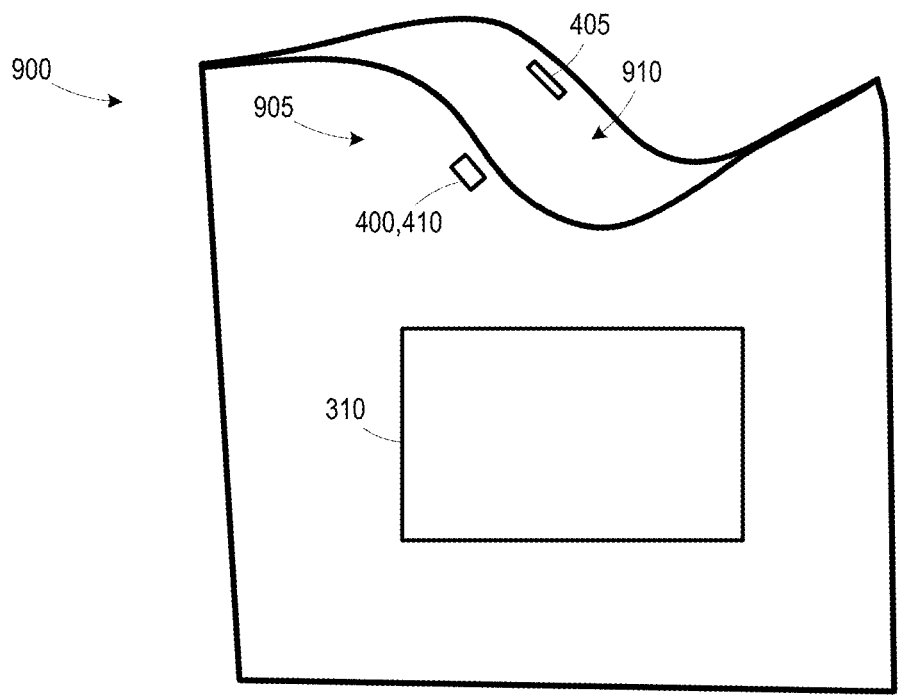
FIGS. 9-12 are diagrams of enclosures for sealing articles, where the seal provides a connection between the identification tag and the antenna, in accordance with some embodiments.

Various packaging techniques may be employed for providing package integrity data for the articles 310 during delivery. FIGS. 9-12 illustrate various enclosures for packaging articles 310. FIG. 9 is a diagram of a bag enclosure 900 that receives one or more articles 310. The bag enclosure 900 includes first and second sealing surfaces 905, 910. The identification tag 400 (and sensor 410 if so equipped) may be affixed to the first sealing surface 905, and the antenna 405 may be affixed to the second sealing surface 910, such that, when the bag enclosure 900 is sealed, a completed circuit is made between the tag 400 and the antenna 405. In one embodiment, a heat sealing process may be used to bond the first and second surfaces 905, 910. In some embodiments, adhesives may be used. In some embodiments, the antenna 405 may be implemented using conductive ink.

A "sealed package" data flag may be set on the tag 400 when the connection to the antenna 405 is made. The tag 400 may set the sealed package flag itself, or an interrogator at the packaging site may set the flag. If the connection between the tag 400 and the antenna 405 is interrupted during the delivery process, i.e., the enclosure 900 is opened, an "opened package" flag may be set, or the sealed package flag may be cleared, for example, by the tag 400 itself.

One technique for verifying package integrity for the mobile device 100 is to periodically write an integrity bit to the tag 400. If the connection between the tag 400 and the antenna 405 is not interrupted, the series of integrity bits will be recorded for later retrieval at the delivery site. If the enclosure 900 was opened, separating the tag 400 from its antenna 405, the integrity bits will not be written and the integrity breach can be determined. In some embodiments, any opening of the enclosure 900 after its initial sealing may irreparably break the connection between the tag 400 and the antenna 405. Such integrity tracking may be useful for articles such as pharmaceuticals, wine, perishable articles, etc.

Figure 10:
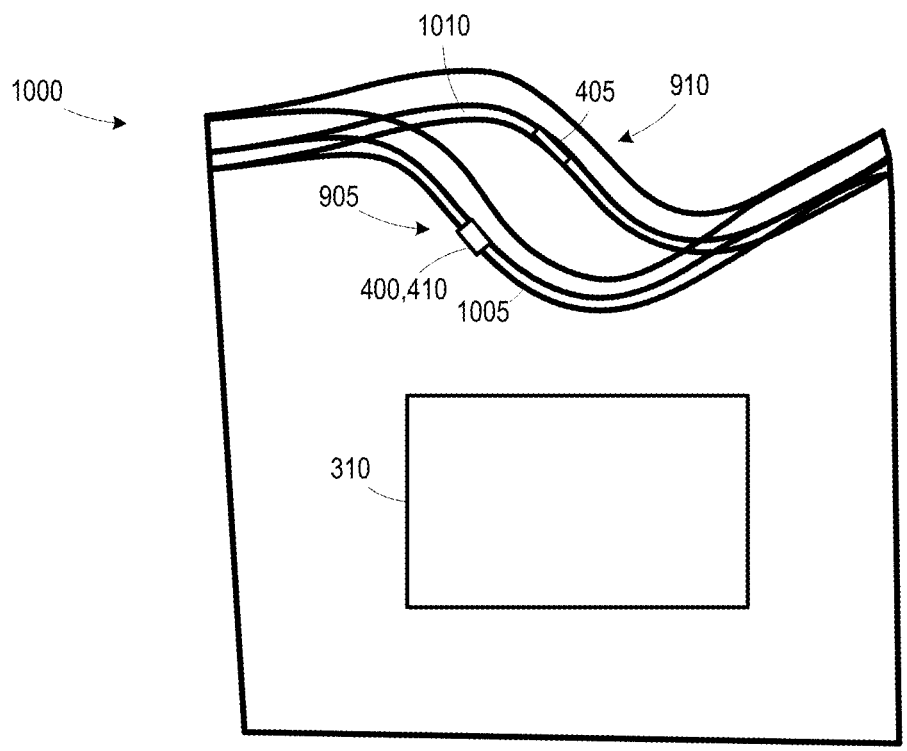

FIG. 10 is a diagram of an alternative embodiment of a bag enclosure 1000 that receives one or more articles 310, in accordance with some embodiments. The bag enclosure 1000 includes a ridge 1005 on the first sealing surface 905 that mates with a groove 1010 in the second sealing surface 910 to affect the sealing of the enclosure 1000. Techniques similar to those described above may be used to track package integrity.

Figure 11:
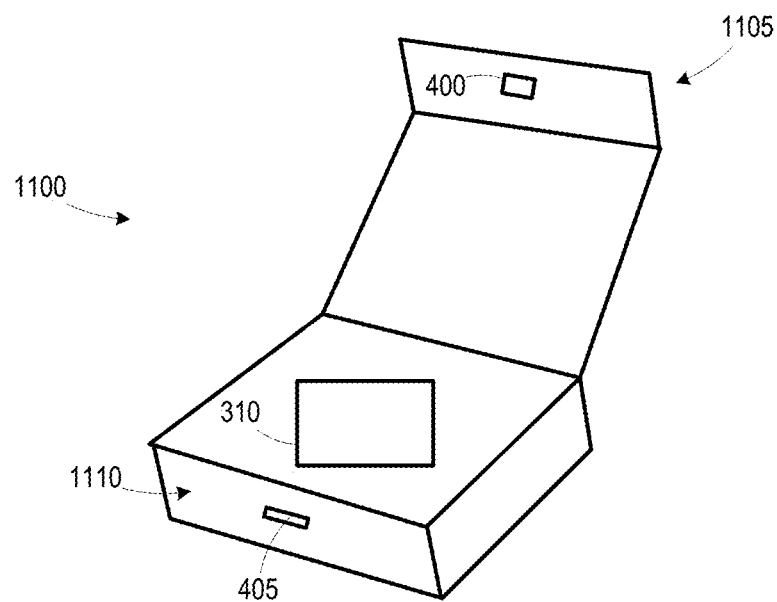

FIG. 11 is a diagram of a box enclosure 1100 that receives one or more articles 310, in accordance with some embodiments. The box enclosure 1100 has a first sealing surface 1105 to which the tag 400 (and sensor 410 if so equipped) is affixed, and a second sealing surface 1110 to which the antenna 405 is affixed. The engagement of the surfaces 1105, 1110 perfects the connection between the tag 400 and the antenna 405 to allow for integrity tracking, as described above.

Figure 12:
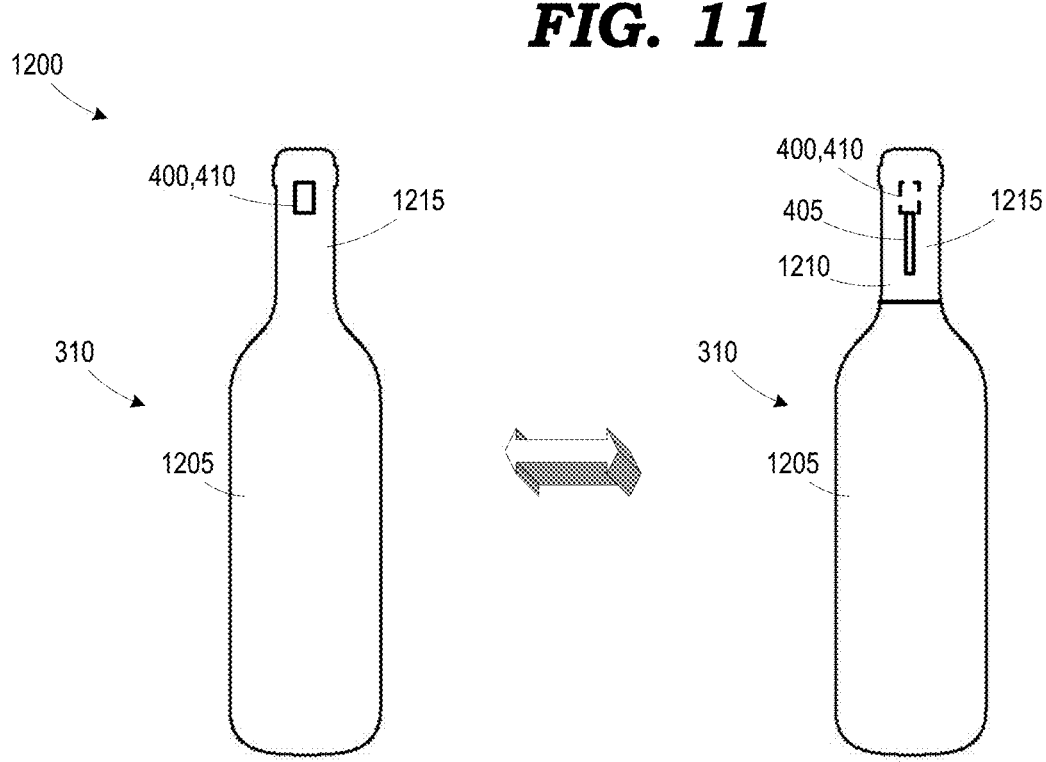

FIG. 12 is a diagram of a bottle enclosure 1200. The bottle 1205 represents the article 310. For example, when shipping expensive wine, it is desirable to verify that the wine was not opened during transit to provide evidence of its authenticity. The tag 400 (and sensor 410 if so equipped) is affixed to the bottle 1205. A wrapper 1210 to which the antenna 405 is affixed is sealed over the bottle 1205 covering the top portion 1215 of the bottle 1205. The bottle 1205 represents the first sealing surface, and the wrapper 1210 represents the second sealing surface. The engagement of the bottle 1205 and the wrapper perfects the connection between the tag 400 and the antenna 405 to allow for integrity tracking, as described above.

An apparatus includes a first surface having an identification tag attached thereto and a second surface having an antenna attached thereto. The first surface engages the second surface to provide a seal for an article and to connect the antenna to the identification tag.

A method for sealing an article includes providing a first surface having an identification tag attached thereto. A second surface having an antenna attached thereto is provided. The first surface is attached to the second surface to provide a seal for the article and to connect the antenna to the identification tag.

In some embodiments, certain aspects of the techniques described above may be implemented by one or more processors of a processing system executing software. The techniques may be implemented by executing software on a computing device, such as the processor 105 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 110 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices, such as Flash memory, a cache, random access memory (RAM), or other non-volatile memory device or devices and the like. The executable instructions stored on the non-transitory computer readable storage medium may be in source code, assembly language code, object code or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. An apparatus, comprising:
   an enclosure comprising an opening defined by a first sealing surface and a second sealing surface;
   an identification tag affixed only to the first sealing surface when the first sealing surface is separated from the second sealing surface; and
   an antenna affixed only to the second sealing surface when the first sealing surface is separated from the second sealing surface;
   wherein sealing the first sealing surface to the second sealing surface both seals the enclosure around an article and completes an electrical circuit between the identification tag and the antenna;
   wherein the identification tag periodically and serially writes an integrity bit on the identification tag while the electrical circuit between the identification tag and the antenna remains uninterrupted.

2. The apparatus of claim 1, wherein the sealing the first sealing surface to the second sealing surface also sets a sealed package data flag on the identification tag.

3. The apparatus of claim 2, wherein the identification tag automatically sets the sealed package data flag on the identification tag when the first sealing surface is sealed to the second sealing surface.

4. The apparatus of claim 2, wherein an interrogator sets the sealed package data flag on the identification tag when the first sealing surface is sealed to the second sealing surface.

5. The apparatus of claim 2, wherein the identification tag automatically clears the sealed package data flag in response to detecting an interruption of the electrical circuit between the identification tag and the antenna.

6. The apparatus of claim 1, wherein the first sealing surface has a groove defined therein proximate one of the identification tag or the antenna, and the second sealing surface has a ridge defined therein proximate the other of the identification tag or the antenna.

7. An apparatus, comprising:
   a first surface having an entirety of an identification tag attached thereto; and
   a second surface having an entirety of an antenna attached thereto, wherein an initial attachment of the first surface to the second surface provides both a seal for an enclosure around an article and completion of an electrical circuit between the antenna and the identification tag;
   wherein the identification tag automatically sets a sealed package flag on the identification tag at the initial attachment of the first surface and the second surface and periodically writes an integrity bit to a serial record of integrity bits on the identification tag so long as the initial attachment of the first surface to the second surface remains uninterrupted.

8. The apparatus of claim 7, wherein the initial attachment of the first surface to the second surface seals a bag around the article and provides the completion of the electrical circuit between the antenna and the identification tag.

9. The apparatus of claim 7, wherein the initial attachment of the first surface to the second surface seals a box around the article and provides the completion of the electrical circuit between the antenna and the identification tag.

10. The apparatus of claim 7, further comprising an adhesive disposed on one of the first surface or the second surface.

11. The apparatus of claim 7, wherein the first surface is defined by the article.

12. The apparatus of claim 7, further comprising a condition sensor coupled to the identification tag.

13. An apparatus, comprising:
    an enclosure comprising an opening defined by a first sealing surface and a second sealing surface;
    an identification tag affixed only to the first sealing surface when the first sealing surface is separated from the second sealing surface; and
    an antenna affixed only to the second sealing surface when the first sealing surface is separated from the second sealing surface;
    wherein sealing the first sealing surface to the second sealing surface both seals the enclosure around an article and completes an electrical circuit between the identification tag and the antenna;
    wherein the sealing the first sealing surface to the second sealing surface also sets a sealed package data flag on the identification tag; and
    wherein an interrogator sets the sealed package data flag on the identification tag when the first sealing surface is sealed to the second sealing surface.

14. The apparatus of claim 13, wherein the identification tag automatically clears the sealed package data flag in response to detecting an interruption of the electrical circuit between the identification tag and the antenna.

15. The apparatus of claim 13, wherein the first sealing surface has a groove defined therein proximate one of the identification tag or the antenna, and the second sealing surface has a ridge defined therein proximate the other of the identification tag or the antenna.

16. The apparatus of claim 13, further comprising an adhesive disposed on one of the first sealing surface or the second sealing surface.

17. The apparatus of claim 13, wherein the first sealing surface is defined by the article.

18. The apparatus of claim 13, wherein the article comprises a bottle.

19. The apparatus of claim 13, wherein the antenna comprises conductive ink.

20. The apparatus of claim 13, further comprising a condition sensor coupled to the identification tag.

\* \* \* \* \*